US011218921B2

(12) United States Patent
Luo et al.

(10) Patent No.: US 11,218,921 B2
(45) Date of Patent: Jan. 4, 2022

(54) CENTRALIZED PCI MANAGEMENT FOR IAB NETWORK

(71) Applicant: QUALCOMM Incorporated, San Diego, CA (US)

(72) Inventors: Jianghong Luo, Skillman, NJ (US); Junyi Li, Chester, NJ (US); Karl Georg Hampel, Hoboken, NJ (US); Navid Abedini, Somerset, NJ (US); Luca Blessent, Whitehouse Station, NJ (US); Tao Luo, San Diego, CA (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/994,998

(22) Filed: Aug. 17, 2020

(65) Prior Publication Data

US 2021/0058835 A1 Feb. 25, 2021

Related U.S. Application Data

(60) Provisional application No. 62/889,446, filed on Aug. 20, 2019.

(51) Int. Cl.
*H04W 36/00* (2009.01)
*H04W 48/16* (2009.01)
*H04W 16/04* (2009.01)

(52) U.S. Cl.
CPC ....... *H04W 36/0061* (2013.01); *H04W 16/04* (2013.01); *H04W 36/0016* (2013.01); *H04W 48/16* (2013.01)

(58) Field of Classification Search
CPC ... H04W 24/02; H04W 84/045; H04W 24/04; H04W 8/26; H04W 76/11
See application file for complete search history.

(56) References Cited

U.S. PATENT DOCUMENTS

| 9,326,225 B2* | 4/2016 | Bakker | H04W 36/0061 |
| 2009/0047955 A1* | 2/2009 | Frenger | H04J 11/0093 |
| | | | 455/436 |
| 2009/0047956 A1* | 2/2009 | Moe | H04W 24/02 |
| | | | 455/436 |

(Continued)

OTHER PUBLICATIONS

Huawei: "Add PCI Configuration Use Case and Requirements", 3GPP Draft; 3GPP TSG-SAS Meeting #127, S5-196310, PCR 28.313 Add PCI Configuralion Use Case and Requirements, 3rd Generation Partnership Project (3GPP), Mobile Competence Centre; 650, Route Des Lucioles; F-06921 Sophia-Antipol, vol. SA WG5, No. Sophia Antipolis, France; Oct. 14, 2019-Oct. 18, 2019, Oct. 4, 2019, XP051811430, 5 Pages, Retrieved from the Internet: URL: https://ftp.3gpp.org/tsg_sa/WG5_TM/TSGS5_127/Docs/S5-196310.zip, [retrieved on Oct. 4, 2019], chapter Z4.

(Continued)

*Primary Examiner* — Dung Hong
(74) *Attorney, Agent, or Firm* — Procopio, Cory, Hargreaves & Savitch

(57) ABSTRACT

A central entity determines a physical cell identifier (PCI) change of an integrated access and backhaul (IAB) node from a first PCI to a second PCI and sends the second PCI to the IAB node. In response to receiving the second PCI from the central entity, the IAB node changes from using the first PCI to using the second PCI for the IAB node.

26 Claims, 13 Drawing Sheets

(56) References Cited

U.S. PATENT DOCUMENTS

| | | | | |
|---|---|---|---|---|
| 2013/0017776 | A1* | 1/2013 | Takano | H04B 7/155 455/7 |
| 2014/0071891 | A1* | 3/2014 | Zhou | H04B 1/7083 370/328 |
| 2015/0245221 | A1* | 8/2015 | Yiu | H04B 7/0417 455/446 |
| 2016/0283990 | A1* | 9/2016 | Moritz | G06F 16/9537 |
| 2017/0238243 | A1* | 8/2017 | Park | H04W 48/16 455/434 |
| 2019/0230530 | A1* | 7/2019 | Henriksson | H04W 24/04 |

OTHER PUBLICATIONS

Huawei: "Add Potential Solution for PCI Configuration", 3GPP Draft; 3GPP TSG-SA5 Meeting #126, S5-195127 PCR TR 28.861 Add Potential Solution for PCI Configuration, 3rd Generation Partnership Project, Mobile Competence Centre; 650, Route Des Lucioles; F-06921 Sophia-Antipol, vol. SA WG5, No. Bruges, Belgium; Aug. 19, 2019-Aug. 23, 20L9, Aug. 18, 2019, XP051760918, 5 Pages, URL: http://www.3gpp.org/ftp/Meetings_3GPP_SYNC/SA5/Docs/S5-195127.zip, [retrieved Aug. 18, 2019], Chapter 5.5.1, Chapter 5.5.2, Chapter 5.5.3, Chapter 7.3; figures 7.2-1.

Huawei: "PCI Selection for Split gNB", 3GPP Draft; R3-192971, 3GPP TSG-RAN3 Meeting #104, 3rd Generation Partnership Project (3GPP), Mobile Competence Centre; 650, Route Des Lucioles; F-06921 Sophia-Antipolis Cedex; France, vol. RAN WG3, No. Reno, Nevada, US; May 13, 2019-May 17, 2019, May 13, 2019 (May 13, 2019), XP051732236, 3 Pages, Retrieved from the Internet: URL: http://www.3gpp.org/ftp/Meetings%5F3GPP%5FSYNC/RAN3/Docs/R3%2D192971%2Ezip, [retrieved on May 13, 2019], Chapter 5.2.1, Chapter 5.2.2.

International Search Report and Written Opinion—PCT/US2020/046774—ISA/EPO—dated Dec. 1, 2020.

* cited by examiner

CENTRALIZED PCI MANAGEMENT FOR IAB NETWORK

CROSS REFERENCE TO RELATED APPLICATION(S)

This application claims the benefit of U.S. Provisional Application Ser. No. 62/889,446, entitled "Centralized PCI Management for IAB Network" and filed on Aug. 20, 2019, which is expressly incorporated by reference herein in its entirety.

BACKGROUND

Technical Field

The present disclosure relates generally to communication systems, and more particularly, to integrated access and backhaul (IAB) networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Integrated access and backhaul (IAB) networks may include multiple cells in communication with each other to provide an access network and a backhaul network to a core network. An IAB network may include a mobile IAB node that may move to different geographic locations within an area covered by the IAB network. Each IAB node may have a Physical Cell Identifier (PCI). The PCI may be reused by multiple geographically separate cells within a network. When moving within the area covered by the IAB network, the mobile IAB node may come into proximity with another stationary or mobile IAB node that may have the same PCI as the mobile IAB node. The situation may be referred to as a PCI collision. Aspects presented herein address possible PCI collisions.

In an aspect of the disclosure, a method, a computer-readable medium, and an apparatus are provided for wireless communication at a central entity. The apparatus determines a PCI change of an IAB node from a first PCI to a second PCI and sends the second PCI to the IAB node.

In an aspect of the disclosure, a method, a computer-readable medium, and an apparatus are provided for wireless communication at an IAB node. The apparatus operates using a first PCI for the IAB node. The apparatus receives a second PCI for the IAB node from a central entity and changes from using the first PCI to using the second PCI for the IAB node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
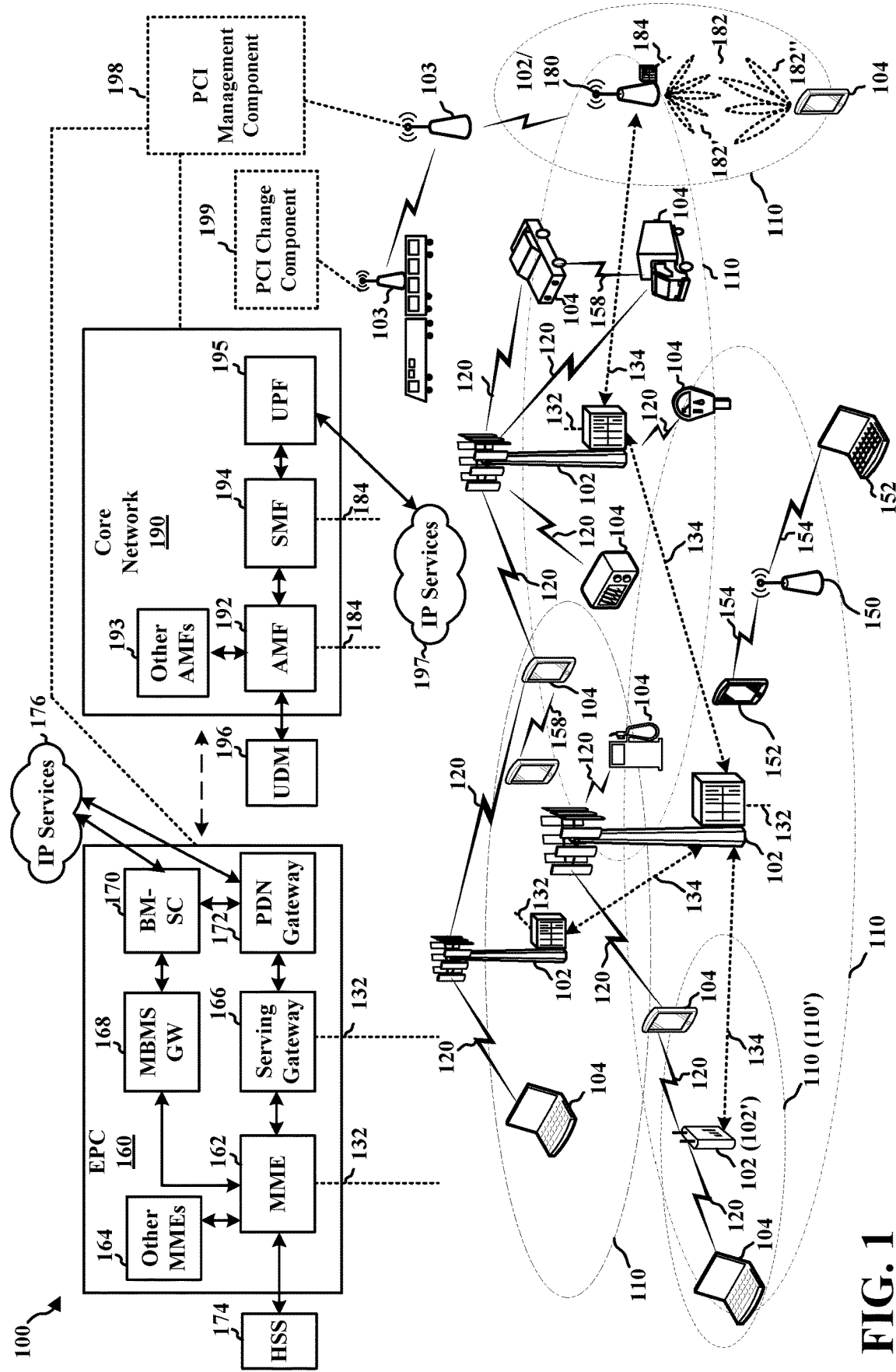
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

IAB networks may include multiple cells in communication with each other to provide an access network and a backhaul network to a core network. An IAB network may include a mobile IAB node that may move to different geographic locations within an area covered by the IAB network. Each IAB node may have a PCI. The PCI may be reused by multiple geographically separate cells within a network. When moving within the area covered by the IAB network, the mobile IAB node may come into proximity with another stationary or mobile IAB node that may have the same PCI as the mobile IAB node. The situation may be referred to as a PCI collision. Aspects presented herein address possible PCI collisions.

Referring again to FIG. 1, in certain aspects, a central entity may comprise a PCI management component 198 configured to determine a PCI change of an IAB 103 from a first PCI to a second PCI and to send the second PCI to the IAB node 103. The central entity may comprise a core network component, e.g., of EPC 160 or core network 190. In another example, the central entity may comprise an IAB node 103 in the IAB network. The IAB node 103 may comprise a PCI change component 199 configured to change from using the first PCI to using the second PCI based on receiving the second PCI from the central entity. Although the following description may be focused on 5G NR, the concepts described herein may be applicable to other similar areas, such as LTE, LTE-A, CDMA, GSM, and other wireless technologies.

Figure 2:
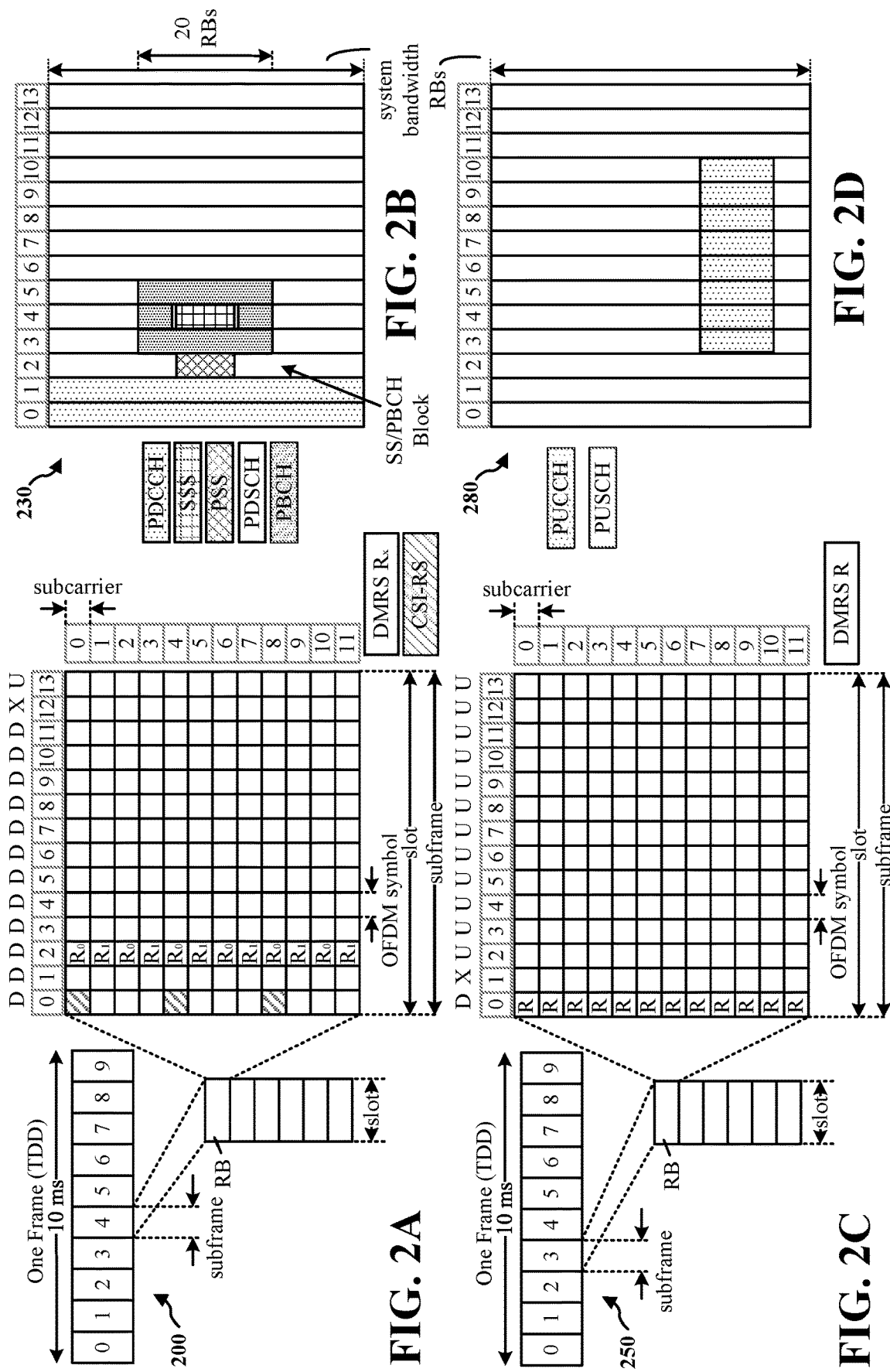
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
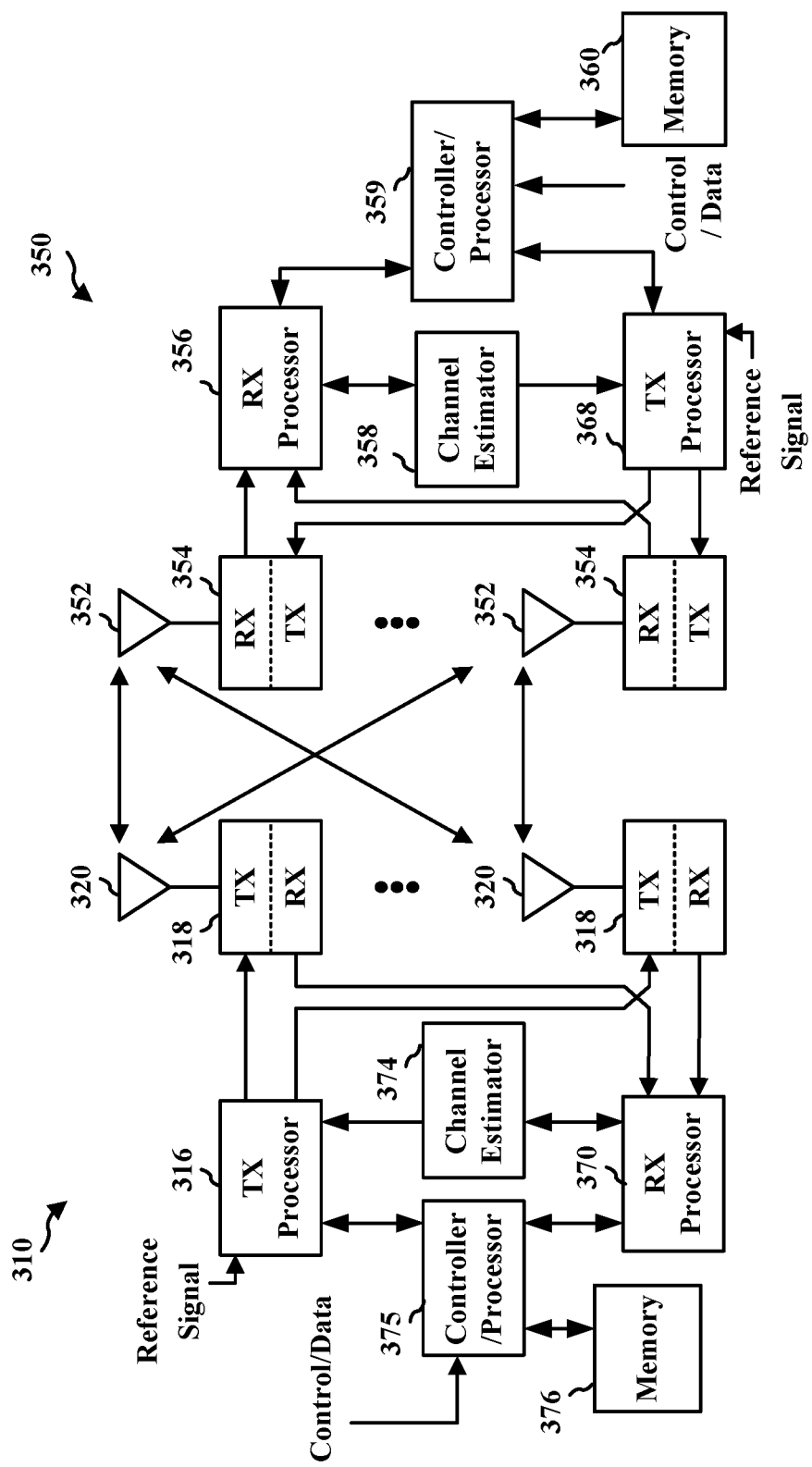
FIG. 3 is a diagram illustrating an example of an IAB and user equipment (UE) in an access network.

FIG. 3 is a block diagram of a IAB node 310 in communication with a UE 350 in an access network. In the DL, IP packets from the EPC 160 or core network 190 may be provided to a controller/processor 375. The controller/processor 375 implements layer 3 and/or layer 2 functionality. Layer 3 includes a radio resource control (RRC) layer, and may be performed if the IAB node is a donor IAB node. Layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the IAB node 310. These soft decisions may be based on channel estimates computed by the channel estimator 358. The soft decisions are then decoded and deinterleaved to recover the data and control signals that were originally transmitted by the IAB node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the IAB node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the IAB node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the IAB node 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160 or core network 190, e.g., via a donor IAB node if the IAB node is not a donor IAB node. The controller/processor 375 is also responsible for error detection using an ACK and/or NACK protocol to support HARQ operations.

At least one of the TX processor 316, the RX processor 370, and the controller/processor 375 may be configured to perform aspects in connection with the PCI management component 198 or the PCI change component 199 of FIG. 1.

Figure 4:
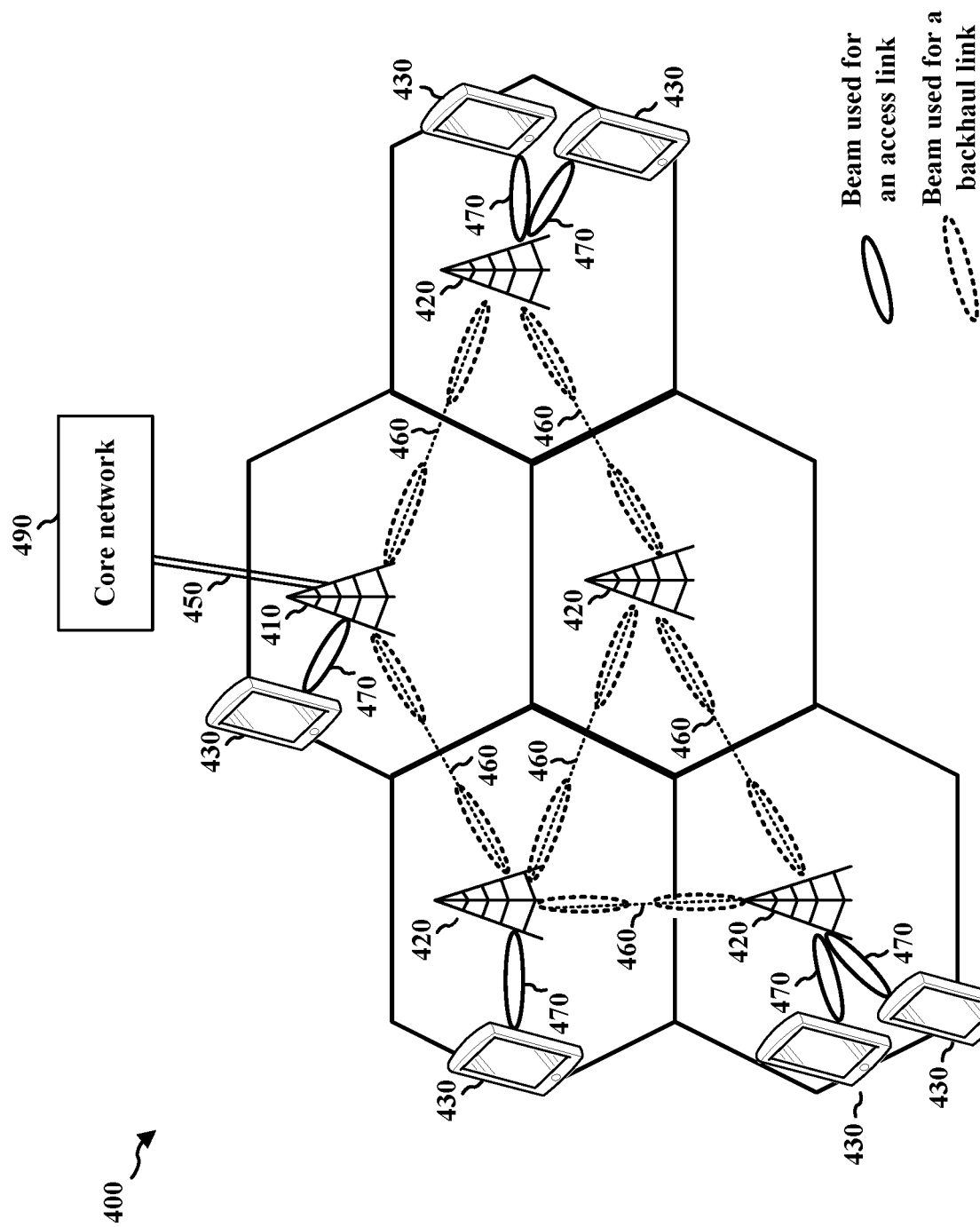
FIG. 4 is a diagram illustrating an IAB network.

FIG. 4 is a diagram illustrating an IAB network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

The UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For example, 5G NR systems may support 1008 PCI values. Accordingly, a given PCI value may be reused in the same network.

Figure 5:
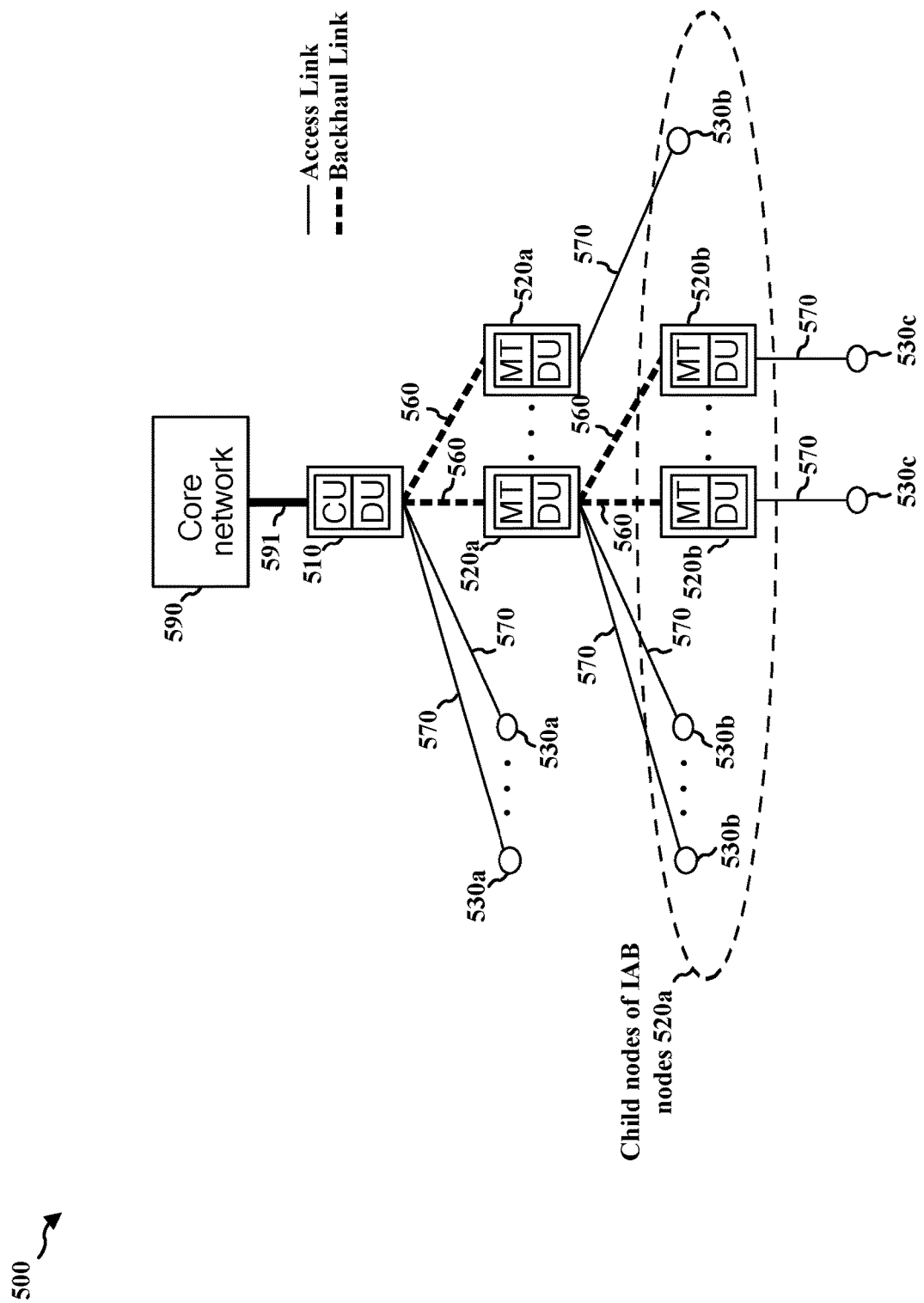
FIG. 5 is a diagram illustrating an IAB network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The CU may provide control for the IAB nodes 520a, 520b in the IAB network 500. For example, the CU may be responsible for configuration of the IAB network 500. The CU may perform RRC and/or PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node that is scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node, the patter of a parent IAB node comprising a DU that schedules a child IAB node/child UE may continue.

Figure 6:
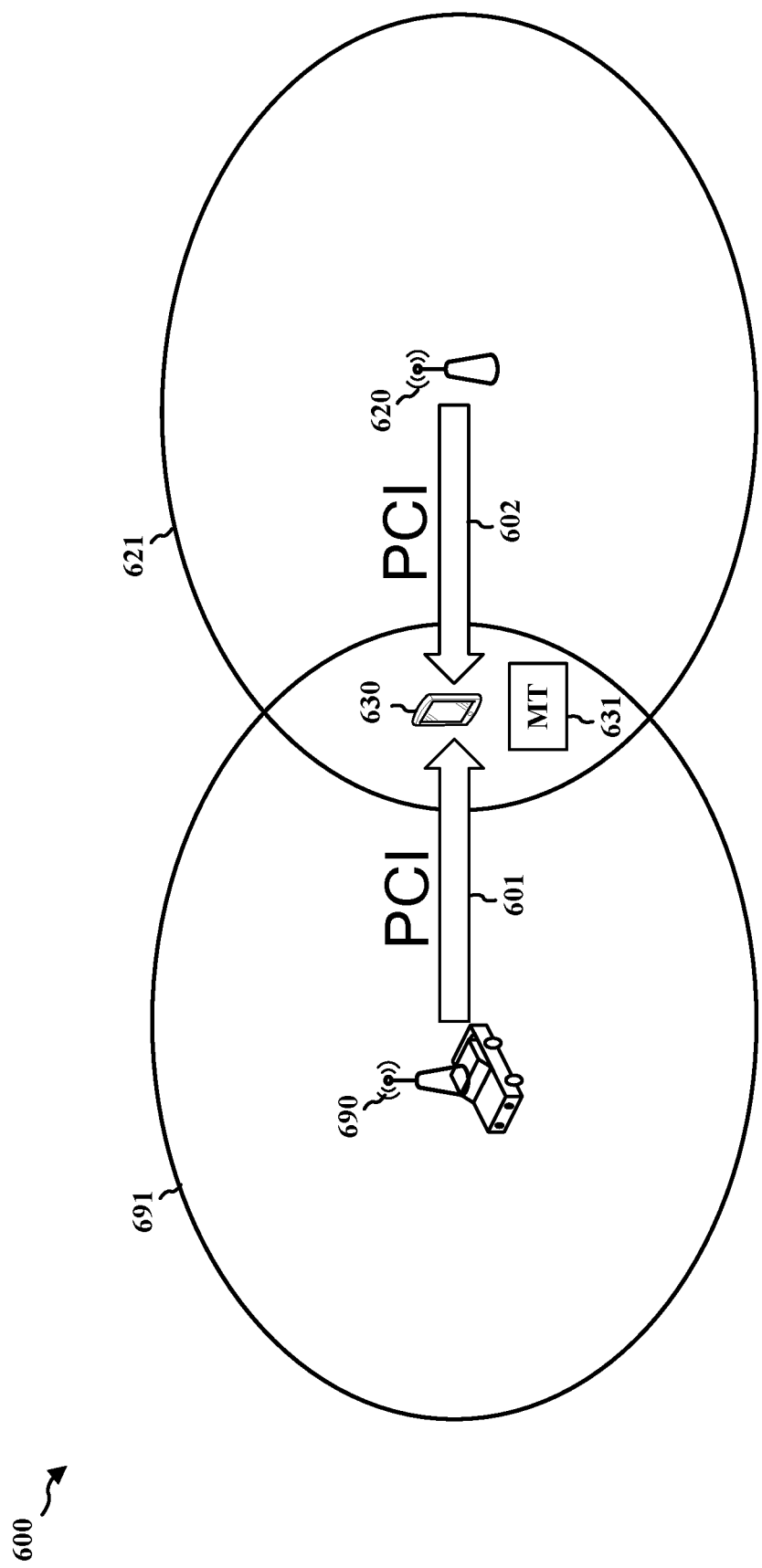
FIG. 6 illustrates nodes of an example IAB network including mobile IAB nodes.

FIG. 6 illustrates nodes of an example IAB network 600 including at least one mobile IAB node. The IAB network 600 includes a mobile IAB node 690 having a coverage area 691 and a second IAB node 620 having a coverage area 621. The second IAB node 620 may be stationary or mobile. The mobile IAB node 690 may move to different geographic locations within an area covered by the mobile IAB network 600. For example, an IAB node may be installed on a bus, a taxi, a train, etc. In some aspects, the mobile IAB node 690 may correspond to a leaf node in the mobile IAB network 600, which may be the last hop IAB-node with only child access UEs 630 connected to it. The mobile IAB node 690 may have no child IAB nodes. In other aspects, the mobile IAB node 690 may be allowed to have another IAB-node as its child node.

As described above, each IAB node may be associated with a particular PCI. The PCI may be an identifier for a cell Due to the limited number of possible PCI values, the PCI may be reused by multiple geographic separated cells in a network. For example, cells with a same PCI may be distinguished by a unique Cell Global Identifiers (NCGI) of a respective cell. The PCI may be carried by PSS/SSS in an SSB block from the IAB node. The PCI may be used to determine scrambling sequence of physical signal or physical channels transmitted by the IAB node. As an example, any of a Physical Broadcast Channel (PBCH), a PDCCH (e.g., PDCCH CoreSet0), a cell-specific PDSCH transmission, etc. from the IAB node may be scrambled based on the PCI for the IAB node. For example, the PCI may be used as a scrambling seed for scrambling the channels. Other channels may be scrambled based on another scrambling seed.

When moving within the area covered by the mobile IAB network 600, the mobile IAB node 690 may come into proximity with the second IAB node 620 that may have the same PCI as the mobile IAB node 690. As signals 601, 602 from the two IAB nodes may be scrambled based on the same PCI, a UE 630 receiving signals 601, 602 from both the mobile IAB node 690 and the second IAB node 620 may not be able to correctly identify the source of the signal, e.g., may be unable to differentiate between signal 601 from IAB node 690 and signal 602 from IAB node 620. For example, a UE may not be able to determine which cell (e.g., IAB node 690 or IAB node 620) a reference signal originated from. The use of a same PCI value by IAB nodes within proximity of each other may be referred to as a PCI collision. PCI collision may lead to issues with timing synchronization and channel estimation, and may further cause decoding failures for data traffic transmitted from at least one of these two neighboring cells. The PCI collision may similarly occur for an MT 631. The PCI of one of the IAB nodes 620, 690 may be changed to resolve a potential PCI collision.

As described herein, the PCI change may be based on central PCI management for the mobile IAB network.

Figure 7:
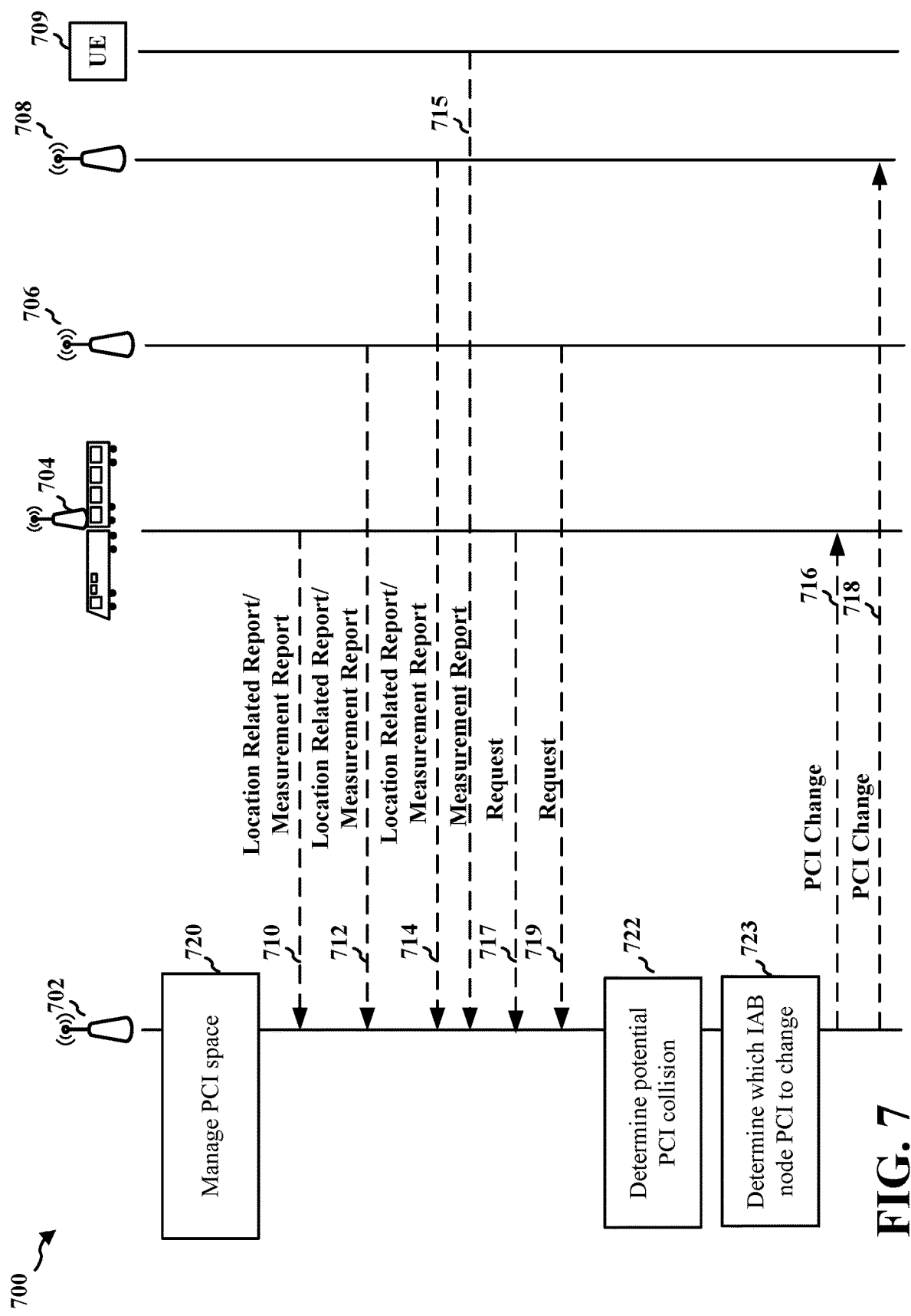
FIG. 7 illustrates an example communication flow between a UE or MT and an IAB node.

FIG. 7 is a communication diagram 700 showing messages between mobile IAB node 704, IAB nodes 706 and 708, and a central entity 702 of a mobile IAB network. The central entity 702 may perform centralized management of PCI values of the IAB nodes in the mobile IAB network. In some aspects, the central entity 702 may be a component of the core network, e.g., a component of EPC 160 or core network 190. For example, the central entity 702 may be an MME 162, an AMF 192, etc. In some aspects, the central entity 702 may be an IAB donor or may be a component of an IAB donor. In some aspects, the central entity 702 may be a stationary IAB node in the mobile IAB network. In some aspects, the central entity 702 may be a base station 102, 180 having larger coverage within the network.

As mobile IAB node 704 moves through the network, the mobile IAB node 704 may come into an area near another IAB node having the same PCI value.

At 720, the central entity 702 may manage the PCI used by the IAB nodes of the mobile IAB network. The central entity 702 may determine whether to change a PCI of an IAB node, e.g., to avoid or resolve a PCI collision. The determination may be based on a report or request received by the central entity. The central entity may determine to change a PCI of a stationary IAB node and/or a mobile IAB node. Once the central entity determines the PCI change, the central entity may send a message with the new PCI value to the determined IAB node. The message may be signaled, e.g., at an interface between the central entity and the determined IAB node, e.g., at an F1-AP interface if the central entity 702 comprises a CU.

For example, the mobile IAB network may be divided into regions (e.g., geographic regions). In some aspects, the regions may be one or more RAN area, one or more tracking area, or one or more system information area. The regions may be based on a partition that is for PCI management purposes. In some aspects, the entire mobile IAB network (e.g., the entire coverage area) may be regarded as one region and all PCI values may be used for the entire mobile IAB network.

Each region may have a set of PCI values assigned for mobile IAB nodes within that region. In some aspects, a set of PCI values for a region may be shared between mobile IAB nodes and stationary IAB nodes in that region. Therefore, a mobile IAB node may have a potential PCI collision with stationary IAB node or with another mobile IAB node. In some aspects, a region may be assigned separate sets of PCI values for mobile IAB nodes and stationary IAB nodes in the region. In this example, a mobile IAB node may only have a potential PCI collision with another mobile IAB node.

The central entity 702 may receive location reports. The central entity 702 may determine that a PCI of an IAB node within the mobile IAB network needs to be changed based on information in a received location report, and may respond by sending a new PCI value to a selected IAB node.

The mobile IAB node 704 may send a location related report (e.g., report 710) to the central entity 702. IAB node 706 may send a location related report (e.g., report 712) to the central entity 702. IAB node 708 may send a location related report (e.g., report 714) to the central entity 702. The location related reports (e.g., reports 710, 712, and 714) may include information about the current geographic location of respective IAB nodes 704, 706, and 708. The current geographic location information may include GPS data and/or the ID of a current parent node of the IAB node (e.g., 704, 706, or 708) providing the location report. The ID of the current parent node may be the PCI of the parent node, a tracking area ID, a RAN area ID, system Information Area ID, and/or a new radio cell global identifier (NCGI). The IAB sending the report may obtain the PCI of the parent IAB node, e.g., in an SSB received from the parent IAB node. For example, an MT of a child IAB node may detect the PCI of the parent IAB based on an SSB received from the parent IAB node.

The reports 710, 712, 714 may include measurement information or may comprise a measurement report. The measurement report may be a report of the IAB node itself, e.g., IAB node 704. The measurement report may be a measurement of an IAB node that can detect another IAB node. For example, IAB node 706 may send a measurement report with information about IAB node 704. The measurement report 715 may be from a UE 709 that detects an IAB node 704. The measurement report may include any of a PCI of a detected cell (e.g., for IAB node 704), an NCGI of a detected cell (e.g., for IAB node 704), etc. The measurement report may include information about the IAB node 704 and/or other nodes that enables the central entity 702 to identify PCI collisions and/or potential PCI collisions. A measurement report may indicate any of, e.g., a cell ID, a measurement for an SSB, a measurement for a reference signal such as CSI-RS, PLMN identity information, frequency band information, SSB subcarrier information, PDCCH configuration information, e.g., for SIB1, etc. PLMN identify information may include, e.g., a PLMN identity list, a tracking area code, a RAN area code, a cell identity, etc. A cell identity may comprise a global ID, e.g., a 36-bit cell global ID within a PLMN. Any SIB, e.g., except a SIB1, may be configured to be cell specific or area specific, e.g., using an indication in SIB1. The cell specific SIB may be applicable within a cell that provides the SIB, while an area specific SIB may be applicable within an area referred to as an SI area. The SI area may comprise one or more cells and may be identified by a system information area ID. Measurements, e.g., of SSB and/or CSI-RS, may be based on any of Reference signal received power (RSRP), Reference Signal Received Quality (RSRQ), Signal to Interference and Noise Ratio (SINR), etc.

In some aspects, the IAB nodes 704, 706, or 708, or UE 709 may transmit the location related reports/measurement reports 710, 712, and 714 to the central entity 702 periodically (e.g., based on a set interval). In some aspects, the IAB nodes or UE 709, 706, 708, or 709 may transmit the location reports 710, 712, or 714 to the central entity 702 when the information sent in a previous location report changes. In some aspects, the IAB nodes 706, or 708, or the UE 709 may transmit the reports 710, 712, and 714 to the central entity 702 upon being prompted by the central entity 702. In some aspects, the mobile IAB node 704 may send the location related or measurement report 710 to the central entity 702 upon entering a different region of the mobile IAB network. As an example, the report may comprise a report of a tracking area ID and/or a RAN area ID. The report may be sent based on a tracking area registration procedure and/or a RAN area registration procedure.

At 722, the central entity 702 may determine whether a PCI collision or a potential PCI collision exists based on one or more report.

The central entity 702 may determine whether a potential PCI collision exists based on determining that the locations of mobile IAB node 704 and IAB node 708, having the same PCI, are too close, and may experience a potential PCI collision. For example, the central entity 702 may determine whether the distance between mobile IAB node 704 and IAB node 708 is below a threshold. The central entity 702 may determine that mobile IAB node 704 and IAB node 708 may experience a potential PCI collision based on determining that mobile IAB node 704 and IAB node 708 being in the same RAN area or the same tracking area. The central entity 702 may determine that mobile IAB node 704 and IAB node 708 may experience a potential PCI collision based on determining that mobile IAB node 704 and IAB node 708 are both child nodes of the same parent IAB node.

The central entity 702 may determine that mobile IAB node 704 and IAB node 708 may experience a potential PCI collision based on determining that reports from the MT of the mobile IAB node 704 or a child UE of the mobile IAB node 704 includes a neighbor cell with the same PCI value of the reporting node.

In some aspects, the location related report, e.g., report 710, may include a planned route for the mobile IAB node 704. For example, the mobile IAB node 704 may be fixed to a train and the location report 710 may include the scheduled route of the train. The central entity 702 may determine that a potential PCI collision may occur by determining that the mobile IAB node 704 will pass an IAB node 708 with the same PCI along the route identified in the location report 710.

Upon determining that a potential PCI collision exists, the central entity 702 may send a message signaling a PCI change to one of the IAB nodes involved in the potential PCI collision, e.g., sending message 716 to the mobile IAB node 704 or sending message 718 to the IAB node 708. The message 716, 718 may include a PCI value, e.g., a new PCI value for the IAB node to use. Upon receiving the message 716, the IAB node 704 may change its PCI, e.g., to a PCI value indicated in the message. Upon receiving message 718, the IAB node 708 may change its PCI, e.g., to the received PCI value.

In some aspects, the central entity 702 may determine to change the PCI of an IAB node 704 based on a request message from the IAB node itself, e.g., IAB node 704, and/or based on a request message from another IAB node, e.g., IAB node 706 or 708. For example, the central entity 702 may receive a request 717 from IAB node 704 to change the PCI for IAB node 704. The central entity 702 may respond with a PCI change message 716 for IAB node 704. Alternatively, or additionally, the central entity 702 may receive a request 719 from IAB node 706 requesting a PCI change for IAB node 704. The central entity 702 may respond with a PCI change message 716 for IAB node 704. The request 717 or 719 may be an explicit request for a new PCI value for the IAB node. The request 717 or 719 may indicate one or more IAB nodes that may have a potential PCI collision, e.g., with the IAB node sending the request. Thus, the request may implicitly request a PCI change from the central entity. In some aspects, PCI collision detection may be performed in a distributed manner by the IAB nodes of the IAB network, and a determination about PCI changes may be performed by the central entity 702. An IAB node may detect a PCI collision when its MT function detects a neighbor IAB node with a same PCI and may send a request, either explicit or implicit, to change the PCI for the IAB node or the neighbor IAB node. An IAB node may detect a potential PCI collision or an actual PCI collision through the performance of its child access UE(s). In response to performance determinations about the child UEs of the IAB node, the IAB node may send a request to the central entity for a PCI update. For example, a serving IAB node and/or the central entity 702 may determine a potential PCI collision when a measurement report about a child UE of the IAB node includes a CSI indicating a good channel quality in combination with a high downlink block error ratio (DL BLER).

In some aspects, the central entity 702 may determine, at 723, which IAB node's PCI to change. For example, if a potential PCI collision is detected for IAB node 704 and IAB node 708, the central entity 702 may determine whether to change the PCI for IAB node 704 or IAB node 708. The central entity 702 may determine whether to change the PCI of the mobile IAB node 704 or the IAB node 708 based on a load parameter (e.g., the number of UEs or IAB nodes connected to each node and/or the buffer status of these child nodes). The central entity 702 may make the determination based on a history parameter. For example, the central entity 702 may attempt to avoid frequently changing the PCI of a cell, and may use a timer that indicates the amount of time since a previous PCI change for a particular cell. The central entity 702 may make the determination based on the service type offered by the nodes. The central entity 702 may prioritize changing the PCI of a cell that provides only non-standalone (NSA) service. The central entity 702 may make the determination based on the type of IAB node. The mobile IAB node 704 may have higher priority to change PCI than the IAB node 708. A mobile IAB node 704 mounted on a bus that primarily provides services to the passengers might have a higher or lower priority for a PCI change than a mobile IAB node that serves any UE in range. In some aspects, the central entity 702 may determine to change the PCI of a mobile IAB node 704 when there is a potential PCI collision with a stationary IAB node. A mobile IAB node, e.g., mounted on a mobile system such as a bus or train, that serves a limited group of UEs (e.g., passengers but not nearby pedestrians) may be treated differently than a mobile IAB node that serves UEs without such restrictions.

Figure 8:
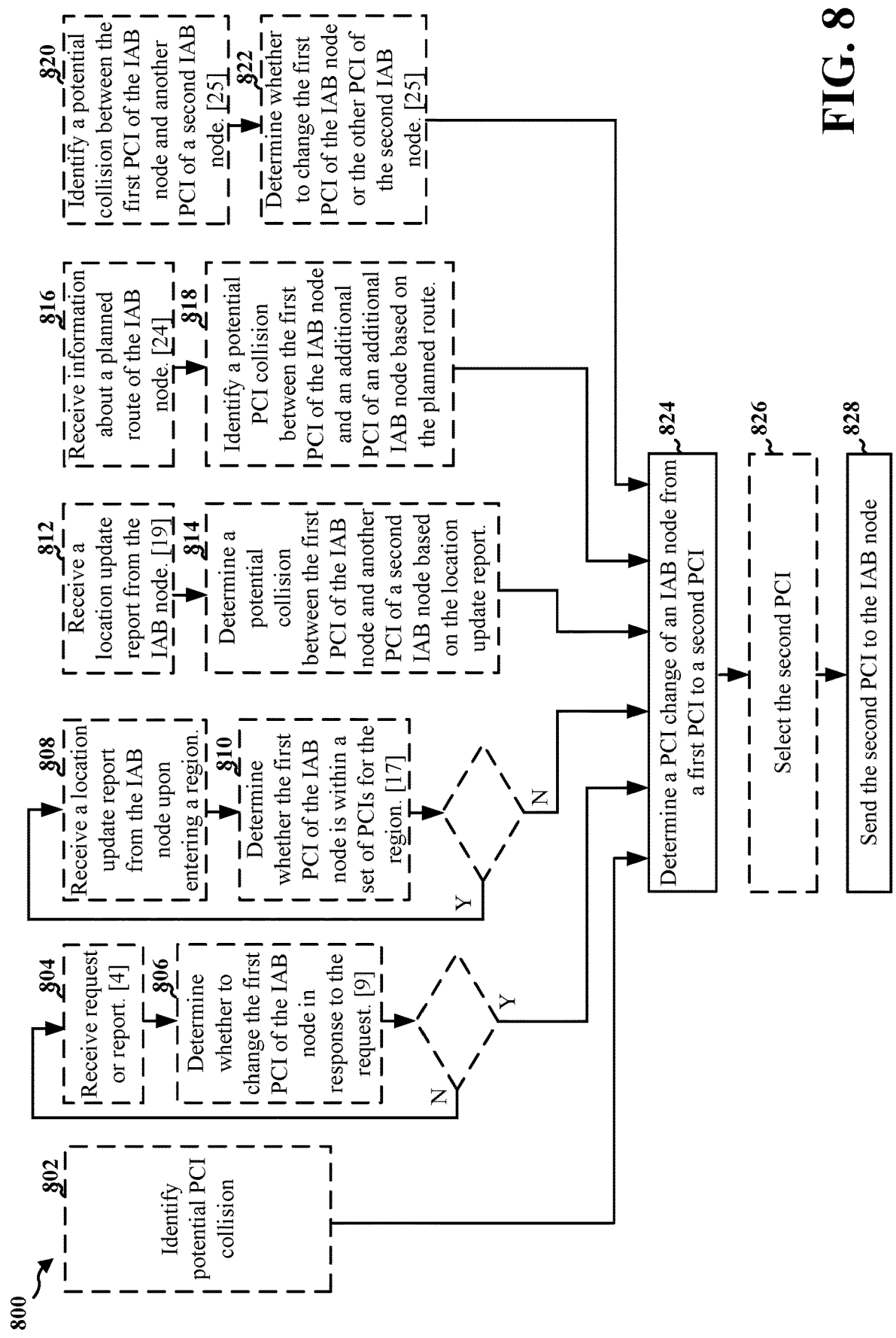
FIG. 8 is a flowchart of a method of wireless communication.

FIG. 8 is a flowchart 800 of a method of wireless communication performed by a central entity for an IAB network. The method may be performed by an IAB node or a component of an IAB node (e.g., IAB node 310). The method may be performed by a core network entity or a component of a core entity (e.g., of EPC 160 or core network 190). The method may be performed by apparatus 902 or 1002. The method may be performed by the processing system 1014 (e.g., which may include the memory 376 and which may be the entire IAB node 310 or a component of an IAB node 310, such as the TX processor 316, the RX processor 370, and/or the controller/processor 375). Optional aspects are illustrated with a dashed line. The method enables the IAB node to change a PCI of an IAB node in response to a potential PCI collision.

At 824, the central entity determines a PCI change of an IAB node from a first PCI to a second PCI. Examples of determining the PCI change are described in connection with 722 of FIG. 7. The determination may be performed, e.g., by PCI change component 908 of apparatus 902 or 1002. The central entity may comprise a core network entity, a donor node, a stationary IAB node, or a base station.

At 828, the central entity sends the second PCI to the IAB node. For example, the second PCI may be sent to the IAB node by PCI change component and/or transmission component 906 of apparatus 902 or 1002. The central entity may comprise a CU and may send the second PCI to the IAB node at an F1-AP interface.

The central entity may identify a PCI collision or a potential PCI collision, at 802, between the first PCI of the IAB node and an additional PCI of an additional IAB node served by the central entity. The central entity may determine the PCI change, at 824, in response to identifying the potential PCI collision. The PCI collision or potential PCI collision may be determined by PCI collision component 910 of apparatus 902 or 1002.

As illustrated at 804, the central entity may receive a request or a report. The request or report may be received by request/report component 912 of apparatus 902 or 1002. The central entity may determine the PCI change, at 824, in response to receiving the request or the report. The request may be received from the IAB node. The request may be received from another IAB node. The request may request a PCI change for the IAB node. The request may indicate a potential PCI collision. The central entity may determine whether to change the first PCI of the IAB node in response to the request, at 806.

As illustrated at 826, the PCI may select the second PCI. The selection may be performed, e.g., by PCI selection component 914 of apparatus 902 or 1002. The selection may be based on a location of the IAB node. For example, the second PCI may be selected from among a set of PCI values associated with a geographic region. The geographic region may be based on at least one of a tracking area, a RAN area, a system information area, or a region partitioned for PCI management. The geographic region may comprise an IAB network served by the central entity.

The set of PCI values may be common to mobile IAB nodes and stationary IAB nodes. Alternately, a first subset of the set of PCI values may be used for selecting the second PCI for a stationary IAB node and a second subset of the set of PCI values may be used for selecting the second PCI for a mobile IAB node.

As illustrated at 808, the central entity may receive a location update report from the IAB node upon entering a region. The location update report may be received by location report component 916 of apparatus 902 or 1002. Then, at 810, the central entity may determine whether the first PCI of the IAB node is within a set of PCIS for the region, wherein the central entity determines the PCI change when the first PCI of the IAB node is not within the set of PCIS for the region. The second PCI may be selected, e.g., at 826, from among the set of PCIS for the region that are not used by another IAB node in the region.

As illustrated at 812, the central entity may receive a location update report from the IAB node. The location update report may be received by location report component 916 of apparatus 902 or 1002. Then, at 814, the central entity may determine a potential collision between the first PCI of the IAB node and another PCI of a second IAB node based on the location update report, wherein the central entity determines the PCI change in response to determining the potential collision. The potential collision may be based on a distance between the IAB node and the second IAB node. The potential collision may be based on the IAB node and the second IAB node being located in a same area. The potential collision may be based on the IAB node and the second IAB node being children nodes of a same parent IAB node. The potential collision may be based on at least one measurement report indicating a neighbor cell having a same PCI value as the IAB node. The location update report may include any of GP S location information of the IAB node, an identifier of a serving parent IAB node of the IAB node, a tracking area identifier, a RAN identifier, a system information identifier, a NCGI of a parent IAB node of the IAB node, or a parent PCI of the parent IAB node. The location update report may be based on the IAB node entering a new region. The location update report may comprise a periodic report.

As illustrated at 816, the central entity may receive information about a planned route of the IAB node. The information may be received, e.g., by route component 918 of apparatus 902 or 1002. At 818, the central entity may identify a potential PCI collision between the first PCI of the IAB node and an additional PCI of an additional IAB node based on the planned route, wherein the central entity determines the PCI change in response to identifying the potential PCI collision.

As illustrated at 820, the central entity may identify a potential collision between the first PCI of the IAB node and another PCI of a second IAB node. The, at 822, the central entity may determine whether to change the first PCI of the IAB node or the other PCI of the second IAB node. The central entity may determine whether to change the first PCI of the IAB node or the other PCI of the second IAB node based on at least one of a load parameter of at least one of the IAB node or the second IAB node, a history parameter of at least one of the IAB node or the second IAB node, a type of service of at least one of the IAB node or the second IAB node, or a type of node of at least one of the IAB node or the second IAB node.

Figure 9:
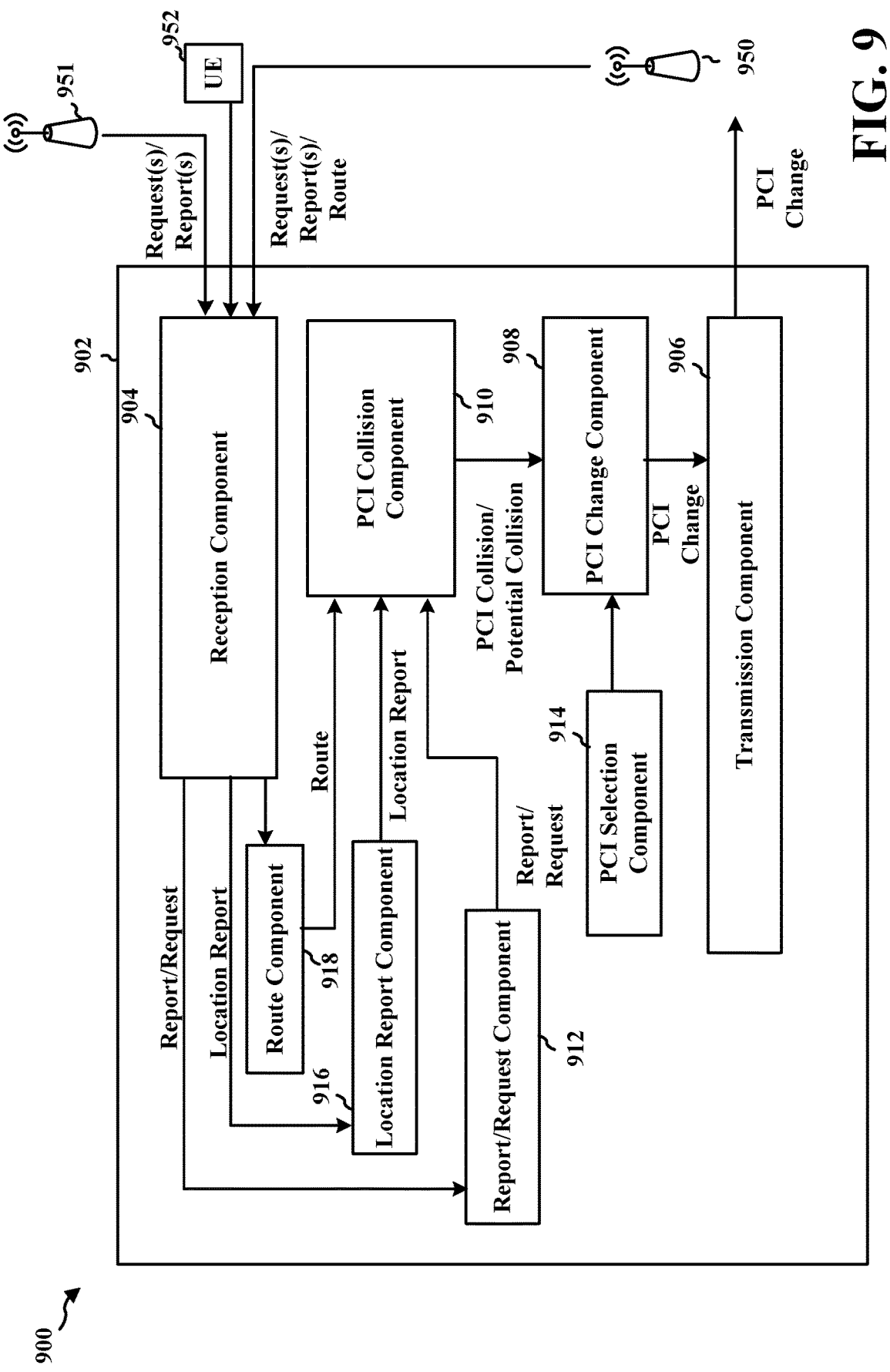
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a central entity for an IAB network. The apparatus may be an IAB node in the IAB network, a base station, a core network entity, an MME, etc. or a component of an IAB node, base station, core network, etc. The apparatus includes a reception component 904 configured to receive communication from IAB node(s) 950, 951 or from UE(s) 952. The apparatus includes a transmission component 906 configured to transmit communication to IAB node(s) 950, 951 or UE(s) 952. The apparatus includes a PCI change component 908 configured to determine a PCI change of an IAB node from a first PCI to a second PCI means for sending the second PCI to the IAB node. The apparatus may include a PCI collision component 910 configured to identify a potential PCI collision between the first PCI of the IAB node and an additional PCI of an additional IAB node served by the central entity. The PCI change may be determined in response to identifying the potential PCI collision. The apparatus may include a request/report component 912 configured to receive a request or a report. The PCI collision component 910 and/or the PCI change component may make the determinations based on the request or the report. The apparatus may include a PCI selection component 914 configured to select the second PCI, e.g., based on a location of the IAB node. The apparatus may include a location report component 916 configured to receive a location update report from the IAB node upon entering a region and for determining whether the first PCI of the IAB node is within a set of PCIs for the region. The PCI collision component 910 and/or the PCI change component may make the determinations when the first PCI of the IAB node is not within the set of PCIs for the region. The PCI collision component 910 and/or the PCI change component may make the determinations based on the location update report. The apparatus may include a route component 918 configured to receive route information about a planned route of the IAB node. The PCI collision component 910 and/or the PCI change component may make the determinations based on the planned route. The PCI change component 908 may be configured to determine whether to change the first PCI of the IAB node or the other PCI of the second IAB node.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
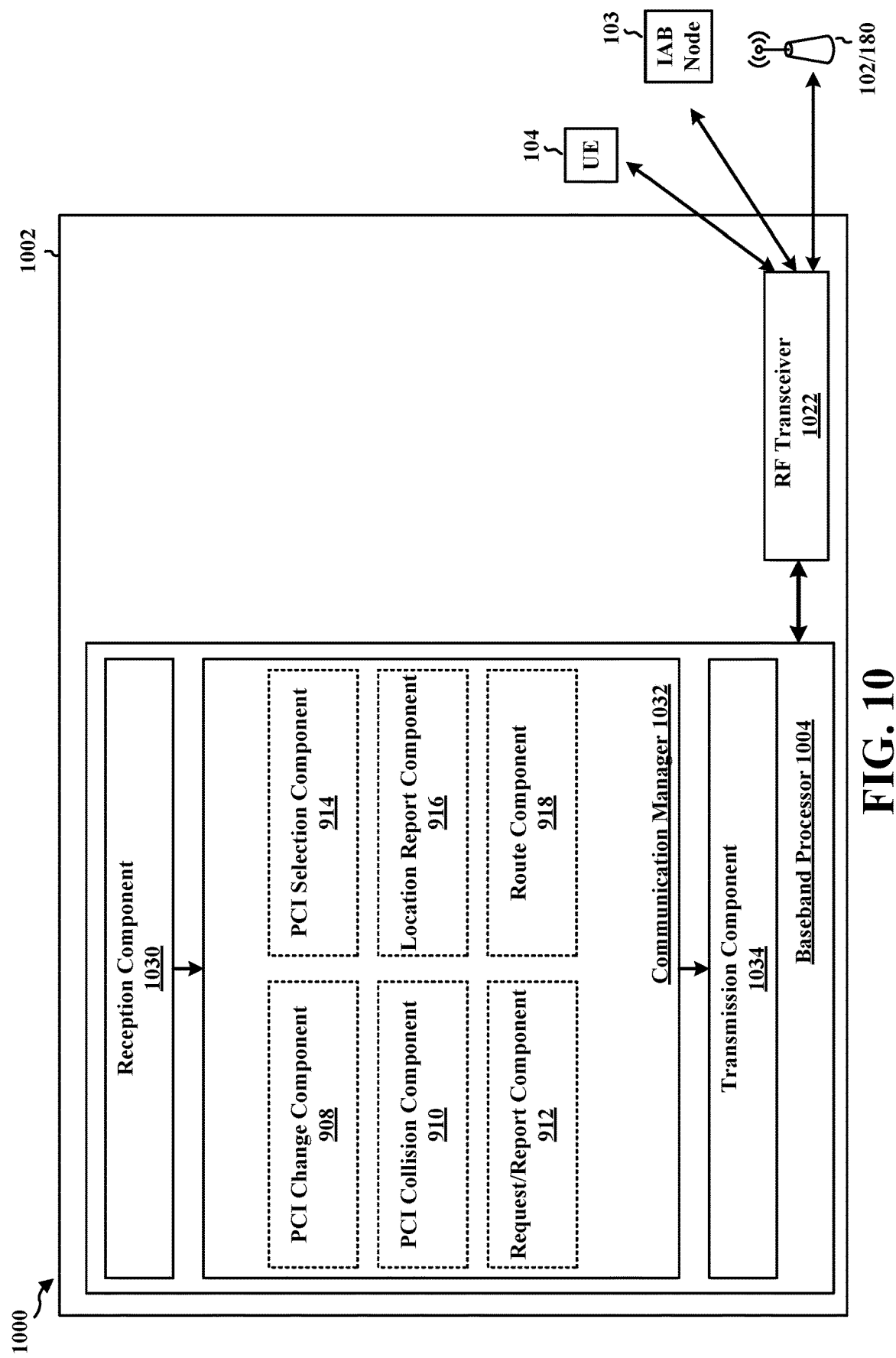
FIG. 10 is a diagram illustrating an example of a hardware implementation for an apparatus employing a processing system.

FIG. 10 is a diagram 1000 illustrating an example of a hardware implementation for an apparatus 1002. The apparatus 1002 is an IAB node, such as IAB node 103, and includes a baseband unit 1004 coupled to an RF transceiver 1022. The apparatus 1002 may be an IAB node in the IAB network, a base station, a core network entity, an MME, etc. or a component of an IAB node, base station, core network, etc. The baseband unit 1004 may communicate through a cellular RF transceiver with the UE 104 or may communicate through the RF transceiver 1022 with other IAB nodes or with a base station 102 or 180 The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the IAB node 310 and may include the memory 376 and/or at least one of the TX processor 316, the RX processor 370, and the controller/processor 375

The communication manager 1032 further includes at least one of the components, 908, 910, 912, 914, 916, 918 described in connection with FIG. 9. The components may be software components running in a processor, resident/stored in the computer readable medium/memory, one or more hardware components coupled to the processor, or some combination thereof. The processing system may be a component of the IAB node 310 and may include the memory 376 and/or at least one of the TX processor 316, the RX processor 370, and the controller/processor 375. Alternatively, the processing system may be the entire IAB node (e.g., see 310 of FIG. 3).

The apparatus 902 or 1002 may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902 or 1002 for wireless communication includes means for determining a PCI change of an IAB node from a first PCI to a second PCI means for sending the second PCI to the IAB node. The apparatus 902 or 1002 may include identifying a potential PCI collision between the first PCI of the IAB node and an additional PCI of an additional IAB node served by the central entity, wherein the central entity determines the PCI change in response to identifying the potential PCI collision. The apparatus 902 or 1002 may include receiving a request or a report, wherein the central entity determines the PCI change in response to receiving the request or the report. The apparatus 902 or 1002 may include determining whether to change the first PCI of the IAB node in response to the request. The apparatus 902 or 1002 may include selecting the second PCI based on a location of the IAB node. The apparatus 902 or 1002 may include receiving a location update report from the IAB node upon entering a region and means for determining whether the first PCI of the IAB node is within a set of PCIs for the region, wherein the central entity determines the PCI change when the first PCI of the IAB node is not within the set of PCIs for the region. The apparatus 902 or 1002 may include receiving a location update report from the IAB node and means for determining a potential collision between the first PCI of the IAB node and another PCI of a second IAB node based on the location update report, wherein the central entity determines the PCI change in response to determining the potential collision. The apparatus 902 or 1002 may include means for receiving information about a planned route of the IAB node and means for identifying a potential PCI collision between the first PCI of the IAB node and an additional PCI of an additional IAB node based on the planned route, wherein the central entity determines the PCI change in response to identifying the potential PCI collision. The apparatus 902 or 1002 may include means for identifying a potential collision between the first PCI of the IAB node and another PCI of a second IAB node and means for determining whether to change the first PCI of the IAB node or the other PCI of the second IAB node. The aforementioned means may be one or more of the aforementioned components of the apparatus 902 or 1002 configured to perform the functions recited by the aforementioned means. As described supra, the means may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
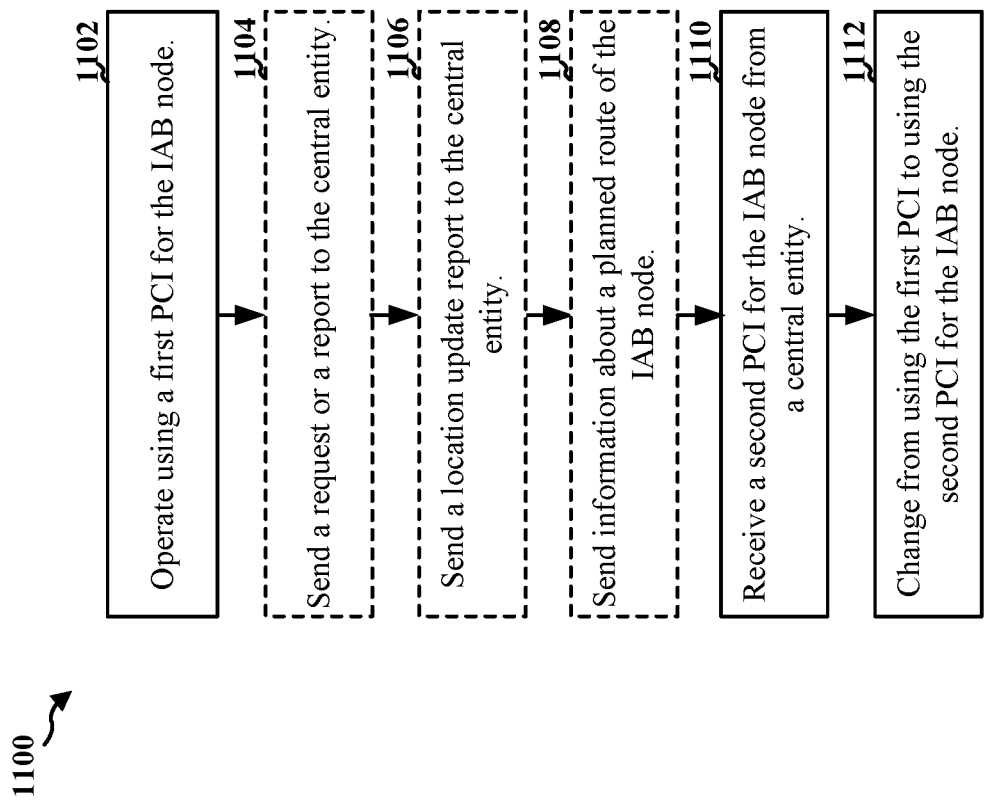
FIG. 11 is a flowchart of a method of wireless communication.

FIG. 11 is a flowchart 1100 of a method of wireless communication. The method may be performed by an IAB node (e.g., the IAB node 310; the apparatus 1202 or 1302, which may include a processing system and the memory 376 and which may be the entire IAB node 310 or a component of the IAB node 310, such as the TX processor 316, the RX processor 370, and/or the controller/processor 375). Optional aspects are illustrated with a dashed line. The method enables an IAB node to handle potential PCI collisions.

At 1102, the IAB node operates using a first PCI. For example, 1102 may be performed by communication component 1208, transmission component 1206, etc. For example, the first PCI may be used to generate a scrambling sequence that is used to scramble at least some of the transmissions from the apparatus 1202 or 1302.

At 1104, the IAB node may send a request or a report to the central entity. For example, 1104 may be performed by request/report component 1212 and/or transmission component 1206 of apparatus 1202 or 1302. The request or report may request a PCI change for the IAB node. The request or report may indicate a potential PCI collision.

At 1106, the IAB node may send a location update report to the central entity. For example, 1106 may be performed by location report component 1214 and/or transmission component 1206 of apparatus 1202 or 1302. The location update report may include at least one of global positioning system (GPS) location information of the IAB node, an identifier of a serving parent IAB node of the IAB node, a tracking area identifier, a RAN identifier, a system information identifier, a NCGI of a parent IAB node of the IAB node, or a parent PCI of the parent IAB node. The location update report may be sent based on the IAB node entering a new region. For example, the IAB node may monitor its present location, determine that it has entered a new region, and send the location update report upon determining that it entered a new region. The location update report may include a periodic report.

At 1108, the IAB node may send information about a planned route of the IAB node, e.g. to the central entity. For example, 1102 may be performed route component 1216 and/or transmission component 1206 of apparatus 1202 or 1302. The second PCI may be received from the central entity in response to sending the planned route of the IAB node, and the second PCI may be received based on a potential PCI collision between the first PCI of the IAB node and an additional PCI of an additional IAB node based on the planned route.

At 1110, the IAB node receives a second PCI for the IAB node from a central entity. For example, 1110 may be performed by reception component 1204 and/or PCI change component 1210 of apparatus 1202 or 1302. The central entity from which the second PCI is received may comprise a core network entity, a donor node, a stationary IAB node, or a base station. The second PCI may be received in response to a request or the report sent at 1104. The central entity may include a central unit (CU) and the second PCI may be received from the central entity at an F1-AP interface of the IAB. The second PCI may be based on a location of the IAB node. The second PCI may be selected from among a set of PCI values associated with a geographic region that is based on at least one of a tracking area, a RAN area, a system information area, a region partitioned for PCI management, or an IAB network served by the central entity.

Finally, at 1112, the IAB node changes from using the first PCI to using the second PCI for the IAB node. For example, 1112 may be performed by PCI change component 1210 of apparatus 1202 or 1302.

Figure 12:
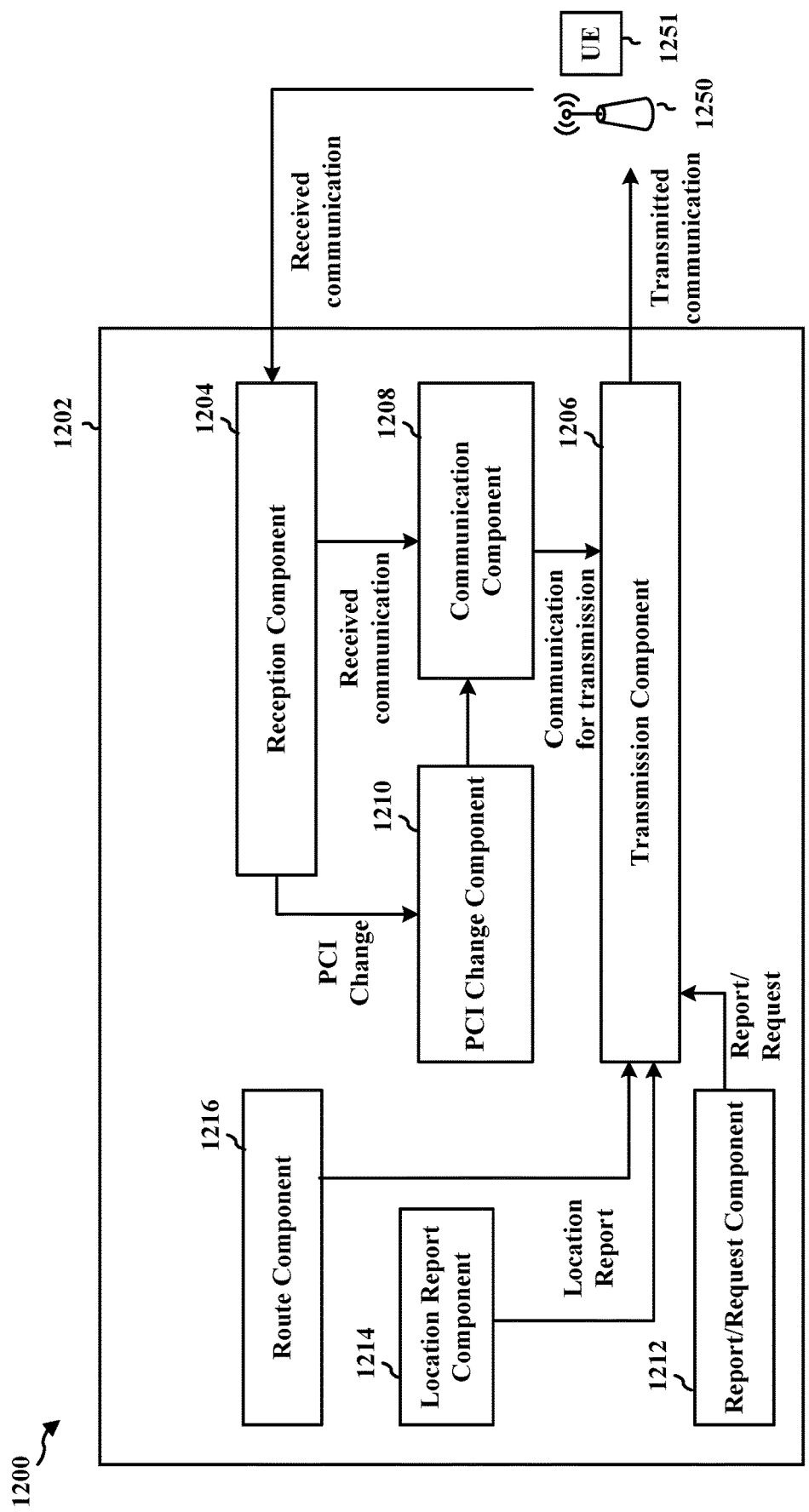
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be an IAB node or a component of an IAB node. The apparatus includes a reception component 904 that receives communication, e.g., from other IAB node(s) 1250 and/or from UE(s) 1251. The apparatus includes a transmission component 1206 that transmits communication to other IAB node(s) 1250 and/or UE(s) 1251. The apparatus includes communication component 1208 configured to operate using a first PCI for the IAB node. The apparatus may include a PCI change component 1210 configured to receive a second PCI for the IAB node from a central entity and to change from using the first PCI to using the second PCI for the IAB node. The apparatus may include a request/report component 1212 configured to send a request or a report to the central entity, wherein the second PCI is received in response to the request or the report. The apparatus may include a location report component 1214 configured to send a location update report to the central entity, wherein the second PCI is received in response to the location update report. The apparatus may include a route component 1216 configured to send information about a planned route of the IAB node, wherein the second PCI is received from the central entity in response to sending the planned route of the IAB node, and wherein the second PCI is received based on a potential PCI collision between the first PCI of the IAB node and an additional PCI of an additional IAB node based on the planned route.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
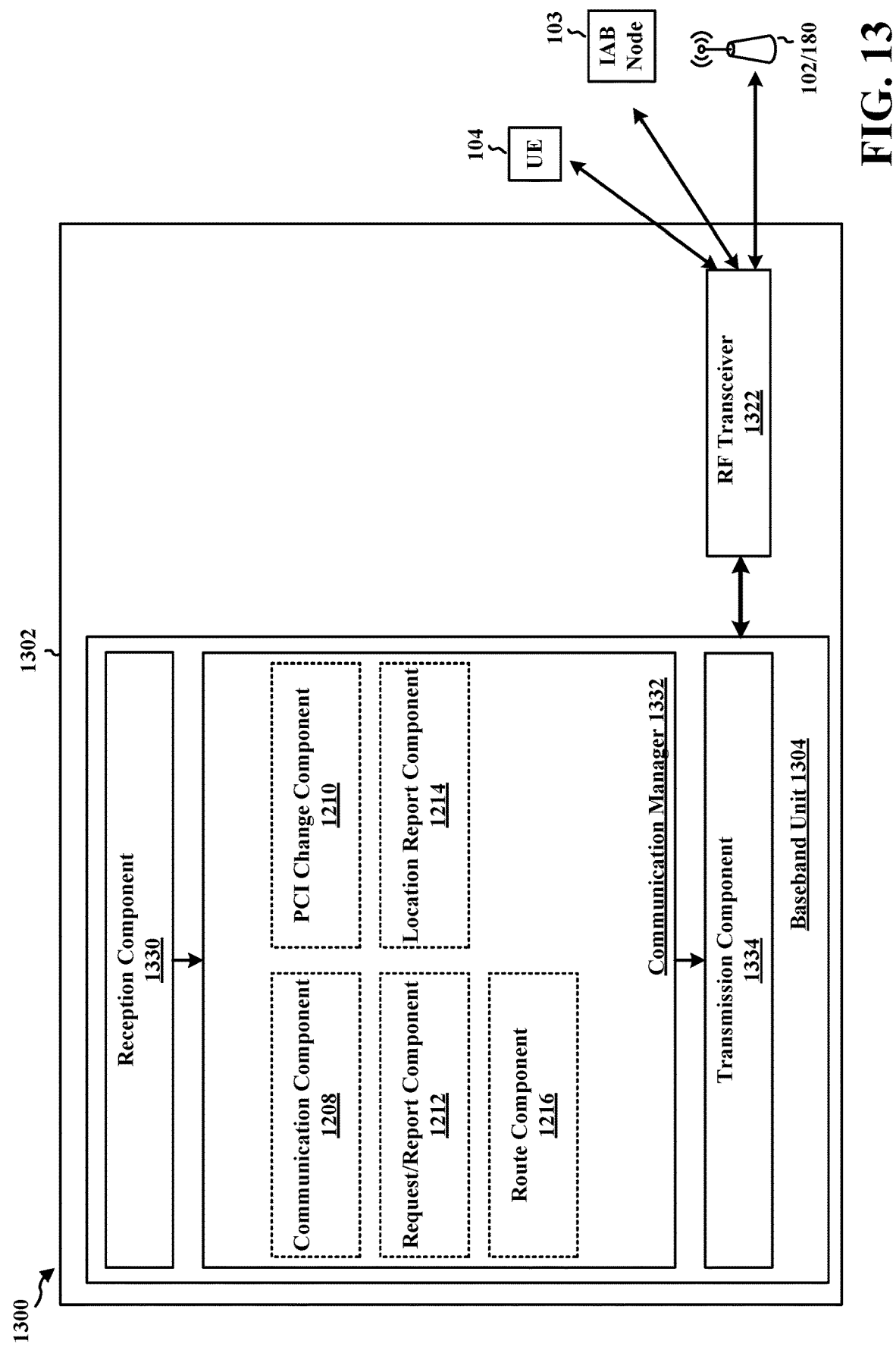
FIG. 13 is a diagram illustrating an example of a hardware implementation for an apparatus employing a processing system.

FIG. 13 is a diagram 1300 illustrating an example of a hardware implementation for an apparatus 1302. The apparatus may be an IAB node or a component of an IAB node and includes a baseband unit 1304 coupled to an RF transceiver 1322. The baseband unit 1304 may communicate through a cellular RF transceiver with the UE 104. The baseband unit 1304 may communicate with another IAB node 103 and/or with a base station 102 or 180 through the RF transceiver 1322. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the IAB node 310 and may include the memory 376 and/or at least one of the TX processor 316, the RX processor 370, and the controller/processor 375.

The processing system 1314 further includes at least one of the components 1204, 1206, 1208, 1210, 1212, 1214, 1216, such as described in connection with FIG. 12. The components may be software components running in a processor, resident/stored in the computer readable medium/memory, one or more hardware components coupled to the processor, or some combination thereof. The processing system 1314 may be a component of the IAB node 310 and may include the memory 376 and/or at least one of the TX processor 316, the RX processor 370, and the controller/processor 375. Alternatively, the processing system 1314 may be the entire IAB node (e.g., see 310 of FIG. 3).

In one configuration, the apparatus 1202 or 1302 for wireless communication includes means for operating using a first a physical cell identifier (PCI) for the IAB node, means for receiving a second PCI for the IAB node from a central entity, and means for changing from using the first PCI to using the second PCI for the IAB node. The apparatus 1202 or 1302 includes means for sending a request or a report to the central entity, wherein the second PCI is received in response to the request or the report. The apparatus 1202 or 1302 may include means for sending a request or a report to the central entity, wherein the second PCI is received in response to the request or the report. The apparatus 1202 or 1302 may include means for sending a location update report to the central entity, wherein the second PCI is received in response to the location update report. The apparatus 1202 or 1302 may include means for sending information about a planned route of the IAB node, wherein the second PCI is received from the central entity in response to sending the planned route of the IAB node, and wherein the second PCI is received based on a potential PCI collision between the first PCI of the IAB node and an additional PCI of an additional IAB node based on the planned route. The aforementioned means may be one or more of the aforementioned components of the apparatus 1202 or 1302 configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other embodiments or teaching described herein, without limitation.

Example 1 is a method of wireless communication at a central entity, comprising: determining a PCI change of an IAB node from a first PCI to a second PCI; and sending the second PCI to the IAB node.

In Example 2, the method of Example 1 further includes that the central entity comprises a core network entity, a donor node, a stationary IAB node, or a base station.

In Example 3, the method of Example 1 or Example 2 further includes identifying a potential PCI collision between the first PCI of the IAB node and an additional PCI of an additional IAB node served by the central entity, wherein the central entity determines the PCI change in response to identifying the potential PCI collision.

In Example 4, the method of any of Examples 1-3 further includes receiving a request or a report, wherein the central entity determines the PCI change in response to receiving the request or the report.

In Example 5, the method of any of Examples 1-4 further includes that the request is received from the IAB node or from another IAB node.

In Example 6, the method of any of Examples 1-5 further includes that the request requests a PCI change for the IAB node or indicates a potential PCI collision.

In Example 7, the method of any of Examples 1-6 further includes determining whether to change the first PCI of the IAB node in response to the request.

In Example 8, the method of any of Examples 1-7 further includes that the central entity comprises a CU, and wherein the second PCI is sent to the IAB node at an F1-AP interface.

In Example 9, the method of any of Examples 1-8 further includes selecting the second PCI based on a location of the IAB node.

In Example 10, the method of any of Examples 1-9 further includes that the second PCI is selected from among a set of PCI values associated with a geographic region.

In Example 11, the method of any of Examples 1-10 further includes that the geographic region is based on at least one of a tracking area, a RAN area, a system information area, a region partitioned for PCI management, or an IAB network served by the central entity.

In Example 12, the method of any of Examples 1-11 further includes that the set of PCI values are common to mobile IAB nodes and stationary IAB nodes.

In Example 13, the method of any of Examples 1-12 further includes that a first subset of the set of PCI values are used for selecting the second PCI for a stationary IAB node and a second subset of the set of PCI values are used for selecting the second PCI for a mobile IAB node.

In Example 14, the method of any of Examples 1-13 further includes receiving a location update report from the IAB node upon entering a region; and determining whether the first PCI of the IAB node is within a set of PCIS for the region, wherein the central entity determines the PCI change when the first PCI of the IAB node is not within the set of PCIs for the region, wherein the second PCI is selected from among the set of PCIs for the region that are not used by another IAB node in the region.

In Example 15, the method of any of Examples 1-14 further includes receiving a location update report from the IAB node; and determining a potential collision between the first PCI of the IAB node and another PCI of a second IAB node based on the location update report, wherein the central entity determines the PCI change in response to determining the potential collision.

In Example 16, the method of any of Examples 1-15 further includes that the potential collision is based on at least one of: a distance between the IAB node and the second IAB node, the IAB node and the second IAB node being located in a same area, the IAB node and the second IAB node being children nodes of a same parent IAB node, at least one measurement report indicating a neighbor cell having a same PCI value as the IAB node, and In Example 17, the method of any of Examples 1-16 further includes that the location update report includes at least one of: GPS location information of the IAB node, an identifier of a serving parent IAB node of the IAB node, a tracking area identifier, a RAN identifier, a system information identifier, a NCGI of a parent IAB node of the IAB node, or a parent PCI of the parent IAB node.

In Example 18, the method of any of Examples 1-17 further includes that the location update report is based on the IAB node entering a new region or the location update report comprises a periodic report.

In Example 19, the method of any of Examples 1-18 further includes receiving information about a planned route of the IAB node; and identifying a potential PCI collision between the first PCI of the IAB node and an additional PCI of an additional IAB node based on the planned route, wherein the central entity determines the PCI change in response to identifying the potential PCI collision.

In Example 20, the method of any of Examples 1-19 further includes identifying a potential collision between the first PCI of the IAB node and another PCI of a second IAB node; and determining whether to change the first PCI of the IAB node or the other PCI of the second IAB node, wherein the central entity determines whether to change the first PCI of the IAB node or the other PCI of the second IAB node based on at least one of: a load parameter of at least one of the IAB node or the second IAB node, a history parameter of at least one of the IAB node or the second IAB node, a service type of service of at least one of the IAB node or the second IAB node, or a node type of at least one of the IAB node or the second IAB node.

Example 21 is a device including one or more processors and one or more memories in electronic communication with the one or more processors storing instructions executable by the one or more processors to cause the device to implement a method as in any of Examples 1-20.

Example 22 is a system or apparatus including means for implementing a method or realizing an apparatus as in any of Examples 1-20.

Example 23 is a non-transitory computer readable medium storing instructions executable by one or more processors to cause the one or more processors to implement a method as in any of Examples 1-20.

Example 24 is a method of wireless communication at an IAB node, comprising: operating using a first PCI for the IAB node; receiving a second PCI for the IAB node from a central entity; and changing from using the first PCI to using the second PCI for the IAB node.

In Example 25, the method of Example 24 further includes that the central entity from which the second PCI is received comprises a core network entity, a donor node, a stationary IAB node, or a base station.

In Example 26, the method of Example 24 or Example 25 further includes sending a request or a report to the central entity, wherein the second PCI is received in response to the request or the report.

In Example 27, the method of any of Examples 24-26 further includes that the request requests a PCI change for the IAB node or the request indicates a potential PCI collision.

In Example 28, the method of any of Examples 24-27 further includes that the central entity comprises a CU, and wherein the second PCI is received from the central entity at an F1-AP interface of the IAB.

In Example 29, the method of any of Examples 24-28 further includes that the second PCI is based on a location of the IAB node and the second PCI is selected from among a set of PCI values associated with a geographic region that is based on at least one of a tracking area, a RAN area, a system information area, a region partitioned for PCI management, or an IAB network served by the central entity, the method further comprising: sending a location update report to the central entity, wherein the second PCI is received in response to the location update report.

In Example 30, the method of any of Examples 24-29 further includes that the location update report includes at least one of: GPS location information of the IAB node, an identifier of a serving parent IAB node of the IAB node, a tracking area identifier, a RAN identifier, a system information identifier, a NCGI of a parent IAB node of the IAB node, or a parent PCI of the parent IAB node.

In Example 31, the method of any of Examples 24-30 further includes that the location update report is sent based on the IAB node entering a new region or the location update report comprises a periodic report.

In Example 32, the method of any of Examples 24-31 further includes sending information about a planned route of the IAB node, wherein the second PCI is received from the central entity in response to sending the planned route of the IAB node, and wherein the second PCI is received based on a potential PCI collision between the first PCI of the IAB node and an additional PCI of an additional IAB node based on the planned route.

Example 33 is a device including one or more processors and one or more memories in electronic communication with the one or more processors storing instructions executable by the one or more processors to cause the device to implement a method as in any of Examples 24-32.

Example 34 is a system or apparatus including means for implementing a method or realizing an apparatus as in any of Examples 24-32.

Example 35 is a non-transitory computer readable medium storing instructions executable by one or more processors to cause the one or more processors to implement a method as in any of Examples 24-32.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a central entity, comprising:
   selecting a physical cell identifier (PCI) change of an integrated access and backhaul (IAB) node from a first PCI to a second PCI from among a set of PCI values associated with a geographic region, the set of PCI values including a first subset of the set of PCI values for selecting the second PCI for a stationary IAB node and a second subset of the set of PCI values for selecting the second PCI for a mobile IAB node, the geographic region being based on a location of the IAB node; and
   sending the second PCI to the IAB node.

2. The method of claim 1, wherein the central entity comprises a core network entity, a donor node, a stationary node, or a base station.

3. The method of claim 1, further comprising:
   identifying a potential PCI collision between the first PCI of the IAB node and an additional PCI of an additional IAB node served by the central entity, wherein the central entity determines the PCI change in response to identifying the potential PCI collision.

4. The method of claim 1, further comprising:
   receiving a request or a report, wherein the central entity determines the PCI change in response to receiving the request or the report.

5. The method of claim 4, wherein the request is received from the IAB node or from another IAB node.

6. The method of claim 4, wherein the request requests a PCI change for the IAB node or indicates a potential PCI collision.

7. The method of claim 6, further comprising:
   determining whether to change the first PCI of the IAB node in response to the request.

8. The method of claim 1, wherein the central entity comprises a central unit (CU), and wherein the second PCI is sent to the IAB node at an F1-AP interface.

9. The method of claim 1, wherein the geographic region is based on at least one of a tracking area, a radio access network (RAN) area, a system information area, a region partitioned for PCI management, or an IAB network served by the central entity.

10. The method of claim 1, wherein the set of PCI values are common to mobile IAB nodes and stationary IAB nodes.

11. The method of claim 1, further comprising:
    receiving information about a planned route of the IAB node; and
    identifying a potential PCI collision between the first PCI of the IAB node and an additional PCI of an additional IAB node based on the planned route, wherein the central entity determines the PCI change in response to identifying the potential PCI collision.

12. A method of wireless communication at a central entity, comprising:
    receiving a location update report from an integrated access and backhaul (IAB) node upon entering a region;
    determining whether a first physical cell identifier (PCI) of the IAB node is within a set of PCIs for the region;
    selecting a PCI change of the IAB node from the first PCI to a second PCI, wherein the central entity determines the PCI change when the first PCI of the IAB node is not within the set of PCIs for the region, wherein the second PCI is selected from among the set of PCIs for the region that are not used by another IAB node in the region; and
    sending the second PCI to the IAB node.

13. A method of wireless communication at a central entity, comprising:
    receiving a location update report from an integrated access and backhaul (IAB) node;
    selecting a physical cell identifier (PCI) change of the IAB node from a first PCI to a second PCI in response to a potential collision between the first PCI of the IAB node and another PCI of a second IAB node based on the location update report; and
    sending the second PCI to the IAB node, wherein the potential collision is based on at least one of:
       a distance between the IAB node and the second IAB node,
       the IAB node and the second IAB node being located in a same area,
       the IAB node and the second IAB node being children nodes of a same parent IAB node, or
       at least one measurement report indicating a neighbor cell having a same PCI value as the IAB node, and
    wherein the location update report includes at least one of:
       global positioning system (GPS) location information of the IAB node,
       an identifier of a serving parent IAB node of the IAB node,
       a tracking area identifier,
       a radio access network (RAN) identifier,
       a system information identifier,
       a new radio cell global identifier (NCGI) of a parent IAB node of the IAB node, or
       a parent PCI of the parent IAB node.

14. The method of claim 13, wherein the location update report is based on the IAB node entering a new region or the location update report comprises a periodic report.

15. A method of wireless communication at a central entity, comprising:
    identifying a potential collision between a first physical cell identifier (PCI) of an integrated access and backhaul (IAB) node and another PCI of a second IAB node;
    determining whether to change the first PCI of the IAB node or the other PCI of the second IAB node, wherein the central entity determines whether to change the first PCI of the IAB node or the other PCI of the second IAB node based on at least one of:

a load parameter of at least one of the IAB node or the second IAB node,
a history parameter of at least one of the IAB node or the second IAB node,
a service type of service of at least one of the IAB node or the second IAB node, or
a node type of at least one of the IAB node or the second IAB node;
selecting the PCI change of the IAB node from the first PCI to a second PCI; and
sending the second PCI to the IAB node.

16. A method of wireless communication at an integrated access and backhaul (IAB) node, comprising:
operating using a first physical cell identifier (PCI) for the IAB node;
receiving a second PCI for the IAB node from a central entity, the second PCI being from among a set of PCI values associated with a geographic region, the set of PCI values including a first subset of the set of PCI values for selecting the second PCI for a stationary IAB node and a second subset of the set of PCI values for selecting the second PCI for a mobile IAB node, the geographic region being based on a current location of the IAB node; and
changing from using the first PCI to using the second PCI for the IAB node.

17. The method of claim 16, wherein the central entity from which the second PCI is received comprises a core network entity, a donor node, a stationary node, or a base station.

18. The method of claim 16, further comprising:
sending a request or a report to the central entity, wherein the second PCI is received in response to the request or the report.

19. The method of claim 18, wherein the request requests a PCI change for the IAB node or the request indicates a potential PCI collision.

20. The method of claim 16, wherein the central entity comprises a central unit (CU), and wherein the second PCI is received from the central entity at an F1-AP interface of the IAB.

21. The method of claim 16, wherein the geographic region that is based on at least one of a tracking area, a radio access network (RAN) area, a system information area, a region partitioned for PCI management, or an IAB network served by the central entity, the method further comprising:
sending a location update report to the central entity, wherein the second PCI is received in response to the location update report.

22. The method of claim 21, wherein the location update report includes at least one of:
global positioning system (GPS) location information of the IAB node,
an identifier of a serving parent IAB node of the IAB node,
a tracking area identifier,
a radio access network (RAN) identifier,
a system information identifier,
a new radio cell global identifier (NCGI) of a parent IAB node of the IAB node, or
a parent PCI of the parent IAB node.

23. The method of claim 21, wherein the location update report is sent based on the IAB node entering a new region or the location update report comprises a periodic report.

24. The method of claim 16, further comprising:
sending information about a planned route of the IAB node, wherein the second PCI is received from the central entity in response to sending the planned route of the IAB node, and wherein the second PCI is received based on a potential PCI collision between the first PCI of the IAB node and an additional PCI of an additional IAB node based on the planned route.

25. An apparatus for wireless communication at a central entity, comprising:
a memory; and
at least one processor coupled to the memory and configured to:
select a physical cell identifier (PCI) change of an integrated access and backhaul (IAB) node from a first PCI to a second PCI from among a set of PCI values associated with a geographic region, the set of PCI values including a first subset of the set of PCI values for selecting the second PCI for a stationary IAB node and a second subset of the set of PCI values for selecting the second PCI for a mobile IAB node, the geographic region being based on a location of the IAB node; and
send the second PCI to the IAB node.

26. An apparatus for wireless communication at an integrated access and backhaul (IAB) node, comprising:
a memory; and
at least one processor coupled to the memory and configured to:
operate using a first physical cell identifier (PCI) for the IAB node;
receive a second PCI for the IAB node from a central entity, the second PCI being from among a set of PCI values associated with a geographic region, the set of PCI values including a first subset of the set of PCI values for selecting the second PCI for a stationary IAB node and a second subset of the set of PCI values for selecting the second PCI for a mobile IAB node, the geographic region being based on a current location of the IAB node; and
change from using the first PCI to using the second PCI for the IAB node.

* * * * *